United States Patent
Yamagishi et al.

(10) Patent No.: US 12,022,168 B2
(45) Date of Patent: Jun. 25, 2024

(54) MATHEMATICAL MODEL DERIVATION APPARATUS, MATHEMATICAL MODEL DERIVATION METHOD AND PROGRAM

(71) Applicant: NIPPON TELEGRAPH AND TELEPHONE CORPORATION, Tokyo (JP)

(72) Inventors: Kazuhisa Yamagishi, Musashino (JP); Noritsugu Egi, Musashino (JP); Noriko Yoshimura, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/904,737

(22) PCT Filed: Sep. 3, 2020

(86) PCT No.: PCT/JP2020/033422
§ 371 (c)(1),
(2) Date: Aug. 22, 2022

(87) PCT Pub. No.: WO2021/181724
PCT Pub. Date: Sep. 16, 2021

(65) Prior Publication Data
US 2023/0072186 A1    Mar. 9, 2023

(30) Foreign Application Priority Data

Mar. 13, 2020    (WO) .................. PCT/JP2020/011195

(51) Int. Cl.
*H04N 21/845*    (2011.01)
*H04N 21/262*    (2011.01)
*H04N 21/647*    (2011.01)

(52) U.S. Cl.
CPC ... *H04N 21/8455* (2013.01); *H04N 21/26208* (2013.01); *H04N 21/647* (2013.01)

(58) Field of Classification Search
CPC ......... H04N 21/8455; H04N 21/26208; H04N 21/647
See application file for complete search history.

(56) References Cited

U.S. PATENT DOCUMENTS

| 2015/0201198 A1* | 7/2015 | Marlatt | ................ | H04N 19/124 |
| | | | | 375/240.03 |
| 2015/0245028 A1* | 8/2015 | Choi | .................... | H04N 19/172 |
| | | | | 382/251 |

(Continued)

FOREIGN PATENT DOCUMENTS

| JP | 2014-036260 | 2/2014 |
| JP | 2015-211424 | 11/2015 |
| WO | 2016/080354 | 5/2016 |

OTHER PUBLICATIONS

"Parametric non-instrusive assessment of audiovisual media streaming quality", Recommendation ITU-T p. 1201, Oct. 14, 2012.

(Continued)

*Primary Examiner* — Joshua D Taylor
(74) *Attorney, Agent, or Firm* — IPUSA, PLLC

(57) ABSTRACT

A mathematical model deriving apparatus includes an encoding unit that generates a plurality of deteriorated videos after encoding an original video, in accordance with a plurality of combinations of a plurality of encoding parameters for a codec setting, a quality estimation unit that calculates a quality estimation value of each of the plurality of deteriorated videos, and a deriving unit that outputs video quality in response to the plurality of encoding parameters as input and derives a coefficient of a mathematical model in accordance with the quality estimation value and the plurality of combinations of the plurality of encoding param- (Continued)

eters. This allows for deriving a mathematical model capable of evaluating quality according to a codec setting.

8 Claims, 5 Drawing Sheets

(56) References Cited

U.S. PATENT DOCUMENTS

2017/0359555 A1* 12/2017 Irani ..................... G06F 3/048
2017/0359582 A1   12/2017 Kawano et al.
2022/0239908 A1*  7/2022 Meng .................. H04N 19/176

OTHER PUBLICATIONS

"Parametric bitstream-based quality assessment of progressive download and adaptive audiovisual streaming services over reliable transport", Recommendation ITU-T p. 1203, Oct. 29, 2017.

"Parametric bitstream-based quality assessment of progressive download and adaptive audiovisual streaming services over reliable transport—Video quality estimation module", Recommendation ITU-T p. 1203.1, Jan. 13, 2019.

Pierre Lebreton and Kazuhisa Yamagishi, "Transferring adaptive bit rate streaming quality models from H.264/HD to H.265/4K-UHD", IEICE Transactions on Communications, vol. E102-B, No. 12, 2019, pp. 2226-2242.

Kazuhisa Yamagishi and Takanori Hayashi, "Parametric Quality-Estimation Model for Adaptive-Bitrate-Streaming Services", IEEE Transactions on Multimedia, vol. 19, No. 7, 2017, pp. 1545-1557.

* cited by examiner

MATHEMATICAL MODEL DERIVATION APPARATUS, MATHEMATICAL MODEL DERIVATION METHOD AND PROGRAM

TECHNICAL FIELD

The present invention relates to a mathematical model deriving apparatus, a mathematical model deriving method, and a program.

BACKGROUND ART

Video communication services (for example, IPTV and adaptive streaming such as HLS, MPEG-DASH) that transfer video media including video and sound (hereinafter, also including voice) between terminals or between servers and terminals via the Internet have become popular.

The Internet is a network whose communication quality is not always guaranteed, and communicating with audio and video media causes lower bit rate due to a narrow line bandwidth between the viewer's terminal and the network, packet loss due to line congestion, delay in packet transfer, and packet retransmission, thus degrading quality of audio media, video media, or the like perceived by the viewers.

Specifically, because a video cannot be distributed at an excessive bit rate via the network, the original video is encoded. However, when the original video is encoded, a video signal in a frame is deteriorated as a result of processing in units of blocks, and the fineness of the entire video is lowered as a result of loss of the high frequency component of the video signal. In addition, because the distribution bit rate cannot be ensured, the resolution of the video is reduced, which lowers the fineness, and due to reduction of the frame rate, the continuity of the video cannot be ensured, which results in a discontinuous video. When a packet of encoded video data is transmitted to the viewer terminal via the network, and packet loss or discard occurs, deterioration occurs in the frame, the throughput or the like declines, and the packet cannot be delivered by the playback timing, because of which the amount of data buffer in the viewer terminal becomes insufficient, and the video playback stops.

Similarly, for sound, as it is not possible to distribute sound at an excessive bit rate via the network, the original sound is encoded. However, when the original sound is encoded, the high frequency component of sound is lost, which results in the loss of clarity of sound. Similar to a video, when encoded sound data is transmitted as a packet to the viewer terminal via the network, and packet loss or discard occurs, distortion occurs in sound, the throughput or the like declines, and the packet cannot be transmitted by the playback timing, because of which the amount of data buffer on the viewer terminal becomes insufficient, and the playback of sound stops.

As a result, the viewer perceives video deterioration, sound deterioration, and deterioration of audiovisual quality.

Thus, to confirm that the service provider is providing the above video communication services with good quality, it is important to be able to measure the quality of audiovisuals experienced by viewers on the viewer terminal and to monitor that quality of the audiovisuals provided to the viewers is high, during the provision of the service. Further, to measure quality on the viewer terminal, it is important from the perspective of the resources of the viewer terminal that quality can be estimated using only easily calculable information such as packet information or metadata, rather than quality estimation using the video signal.

Thus, audiovisual quality estimation techniques that can adequately represent the audiovisual quality experienced by viewers is awaited.

As an existing method for evaluating audiovisual quality, for example, there is a quality estimation method disclosed in NPL 1 to NPL 5.

Specifically, there is a technique by which a transmitted packet and a setting value obtained from a service provider or the like are used as an input, and the extent of propagation of the deterioration because of the loss of a video frame caused by packet loss is taken into consideration to derive a sound, video, and audiovisual quality evaluation value in a short period of time (for example, approximately 10 seconds) with respect to the length of the actual content (for example, 30 minutes, one hour, two hours, and the like) (see, for example, NPL 1).

Also, there is a technique by which metadata related to transmitted video distribution (for example, a resolution, frame rate, bit rate, and the like) and a setting value obtained from a service provider (for example, codec or the like) are used as an input to derive an audiovisual quality evaluation value in a short period of time (for example, approximately 10 seconds) with respect to the length of the actual content (for example, 30 minutes, one hour, two hours, and the like) (see, for example, NPL 2 to NPL 5).

As described above, the existing quality estimation method estimates the sound, video, and audiovisual quality evaluation values in a short period of time.

CITATION LIST

Non Patent Literature

NPL 1: Parametric Non-intrusive Assessment of Audiovisual Media Streaming Quality, ITU-T P. 1201

NPL 2: Parametric Bitstream-based Quality Assessment of Progressive Download and Adaptive Audiovisual Streaming Services over Reliable Transport, ITU-T P. 1203

NPL 3: Parametric Bitstream-based Quality Assessment of Progressive Download and Adaptive Audiovisual Streaming Services over Reliable Transport-Video Quality Estimation Module, ITU-T P. 1203.1

NPL 4: P. Lebreton and K. Yamagishi, "Transferring Adaptive Bit Rate Streaming Quality Models from H. 264/HD to H.265/4K-UHD," IEICE Transactions on Communications, Vol. E102-B, No. 12, pp. 2226-2242, December 2019.

NPL 5: K. Yamagishi and T. Hayashi, "Parametric Quality-Estimation Model for Adaptive-Bitrate Streaming Services," IEEE Transactions on Multimedia, Vol. 19, No. 7, pp. 1545-1557, 2017.

SUMMARY OF THE INVENTION

Technical Problem

Unfortunately, the technique of NPL 1 to NPL 5 (parametric model) has an issue that, even when quality after encoding is estimated for different codec settings (for example, the profile, number of encoding passes, Group of Picture (GoP) size, motion vector search range, and the like), for example, as long as the same input parameters are used, the same quality value is output even for videos or the like of clearly different quality levels (Issue 1). This is because the techniques of NPL 1 to NPL 5 estimate the sound, video, and audiovisual quality from parameters such as codec information and bit rate.

In addition, NPL 1 to NPL 5 does not describe any guidance or handling method for comparative evaluation of quality values estimated based on a plurality of codec settings as described above, because users of the quality estimation method cannot optimize the quality estimation method to each codec setting or use the method (Issue 2).

Further, in optimizing the quality estimation methods of NPL 1 to NPL 5, generally, a subjective quality evaluation is performed to obtain a subjective quality value for each setting parameter, and then coefficients of a mathematical model are optimized based on the relationship between the obtained subjective quality values and the parameters. To obtain subjective quality values for multiple codecs, it is necessary to conduct experiments that include settings for a large number of codecs. Unfortunately, subjective quality evaluation requires a large number of experimental participants and experimental videos, and thus, subjective quality values cannot be prepared mechanically (Issue 3).

The present invention has been made in view of the above points, and an object of the present invention is to make it possible to derive a mathematical model capable of evaluating quality according to a codec setting.

Means for Solving the Problem

To solve the above issues, a mathematical model deriving apparatus includes an encoding unit that generates a plurality of deteriorated videos after encoding an original video in accordance with a plurality of combinations of a plurality of encoding parameters for a codec setting, a quality estimation unit that calculates a quality estimation value of each of the plurality of deteriorated videos, and a deriving unit that outputs video quality in response to the plurality of encoding parameters as input and derives a coefficient of a mathematical model in accordance with the quality estimation value and the plurality of combinations of the plurality of encoding parameters.

Effects of the Invention

This allows for deriving a mathematical model capable of evaluating quality according to a codec setting.

DESCRIPTION OF EMBODIMENTS

Figure 1:
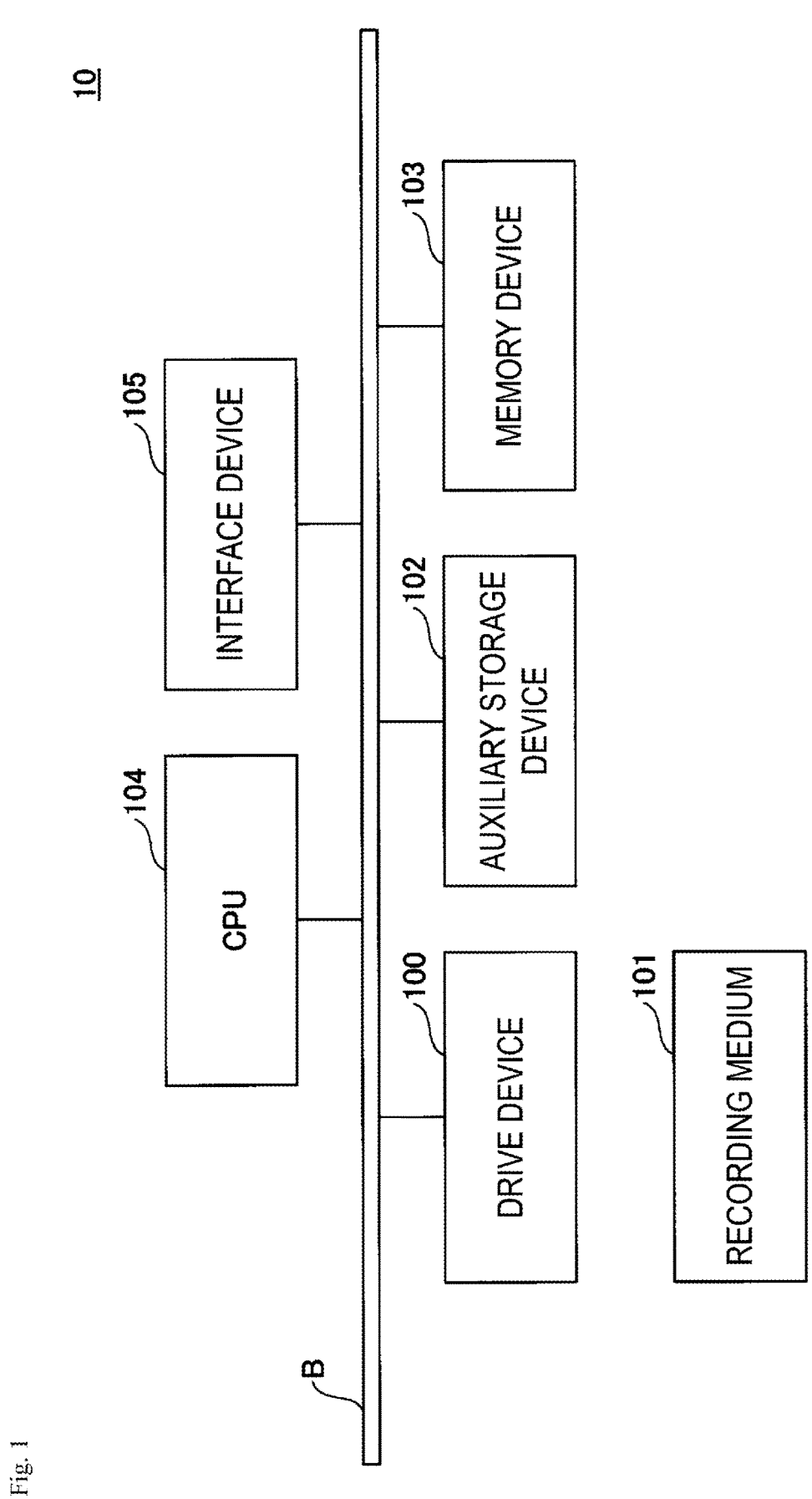
FIG. 1 is a diagram illustrating a hardware configuration example of a mathematical model deriving apparatus 10 according to an embodiment of the present disclosure.

Hereinafter, embodiments of the present disclosure will be described with reference to the drawings. FIG. 1 is a diagram illustrating a hardware configuration example of a mathematical model deriving apparatus 10 according to an embodiment of the present disclosure. The mathematical model deriving apparatus 10 in FIG. 1 includes a drive device 100, an auxiliary storage device 102, a memory device 103, a central processing unit (CPU) 104, an interface device 105, and the like which are connected to each other via a bus B.

A program that achieves processing in the mathematical model deriving apparatus 10 is provided on a recording medium 101 such as a flexible disk or a compact disc read-only memory (CD-ROM). When the recording medium 101 storing the program is set in the drive device 100, the program is installed in the auxiliary storage device 102 from the recording medium 101 via the drive device 100. However, the program does not necessarily have to be installed from the recording medium 101 and may be downloaded from another computer via a network. The program may also be installed as a part of another program. The auxiliary storage device 102 stores the installed program and also stores necessary files, data, and the like.

The memory device 103 reads and stores the program from the auxiliary storage device 102 when the program is instructed to start. The CPU 104 executes a function relating to the mathematical model deriving apparatus 10 according to the program stored in the memory device 103. The interface device 105 is used as an interface for connection to a network.

Figure 2:
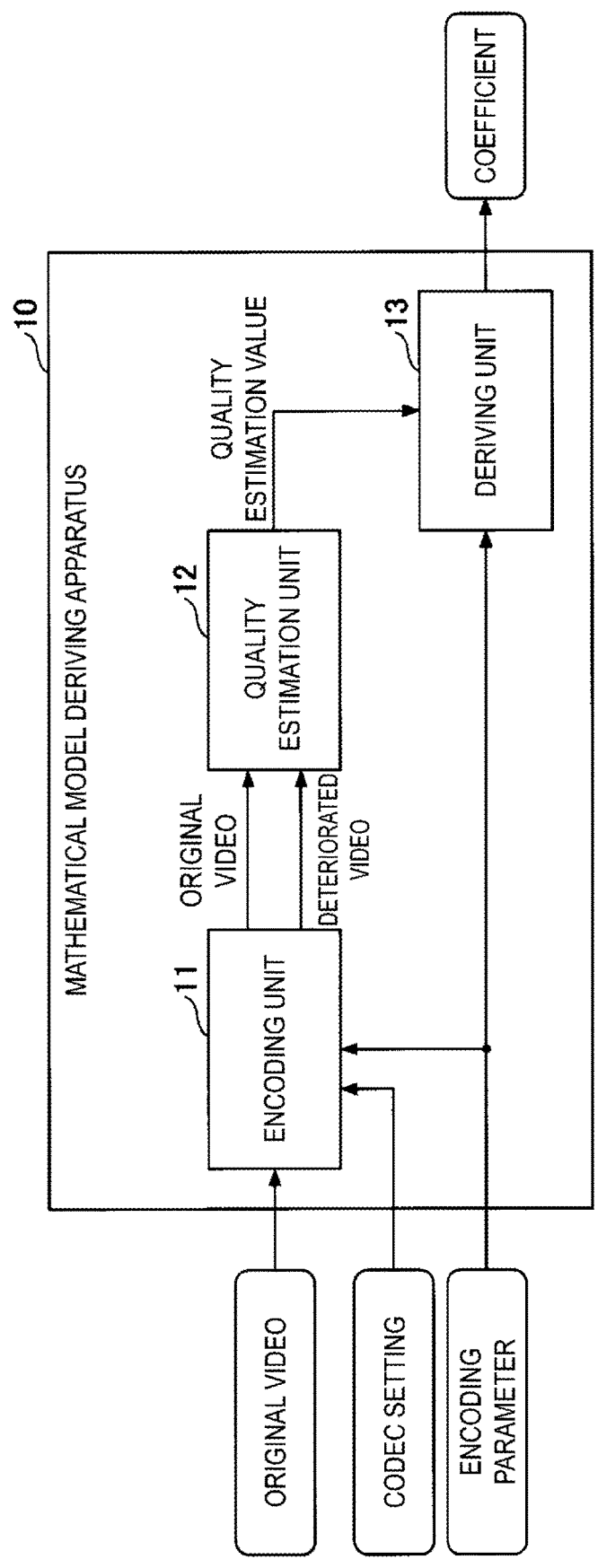
FIG. 2 is a diagram illustrating a functional configuration example of the mathematical model deriving apparatus 10 according to the embodiment of the present disclosure.

FIG. 2 is a diagram illustrating a functional configuration example of the mathematical model deriving apparatus 10 according to the embodiment of the present disclosure. In FIG. 2, the mathematical model deriving apparatus 10 includes an encoding unit 11, a quality estimation unit 12, a deriving unit 13 to allow for deriving a mathematical model capable of evaluating the quality according to the codec setting. Each of these units is implemented by a process of causing the CPU 104 to execute one or more programs installed in the mathematical model deriving apparatus 10. That is, each of these units is implemented by a cooperation of hardware resources of the mathematical model deriving apparatus 10 and programs (software) installed in the mathematical model deriving apparatus 10.

Figure 3:
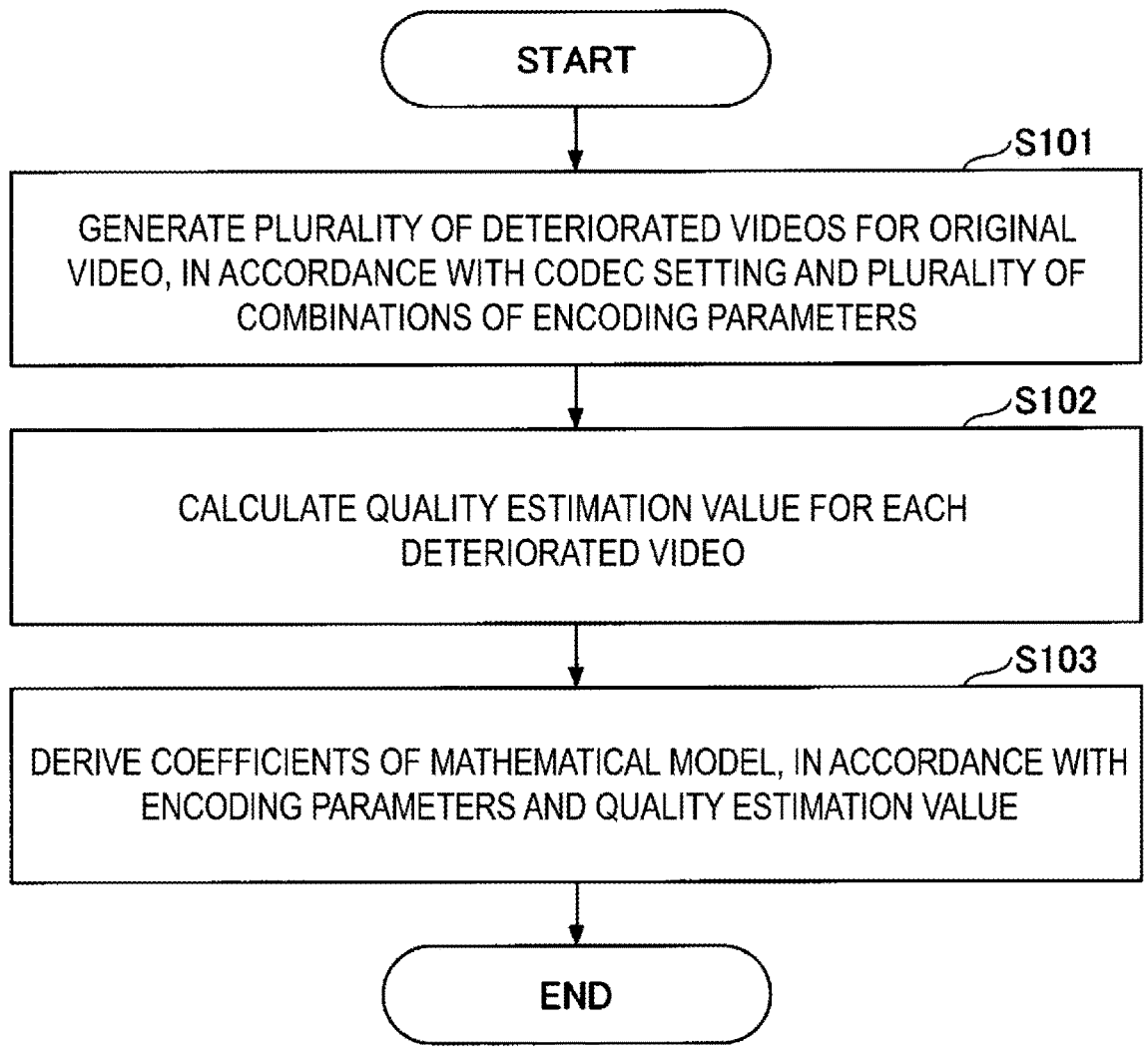
FIG. 3 is a flowchart for explaining an example of a processing procedure executed by the mathematical model deriving apparatus 10.

Hereinafter, a processing procedure executed by the mathematical model deriving apparatus 10 will be described. FIG. 3 is a flowchart for explaining an example of a processing procedure executed by the mathematical model deriving apparatus 10.

Firstly, the encoding unit 11 receives an input of a plurality of combinations of one original video (a pre-encoding video of approximately 10 seconds), one or more codec settings (for example, the profile, number of encoding passes, GoP size, motion estimation range, and the like), and a plurality of encoding parameters for each of the codec settings (for example, the resolution, frame rate, bit rate). The encoding unit 11 generates a video after the original video is encoded (hereinafter, referred to as "deteriorated video") for each of the codec settings, based on a plurality of combinations of encoding parameters for the codec setting, and outputs the original video and a plurality of deteriorated videos to the quality estimation unit 12 (S101). In other words, the deteriorated video is generated for each combination of encoding parameters. For example, if nine combinations of encoding parameters are input for one codec setting, nine deteriorated videos are generated. Here, for the codec settings and the encoding parameters, for example, values used in actual operation are input. That is, the codec settings and the encoding parameters are generally information that the service provider can know. Similarly, among the encoding parameters, the resolution and the frame rate are set as expected to be used by the service provider.

However, as for the deteriorated videos, it is desirable that videos of very good quality to very bad quality (that is, a plurality of qualities) are generated. In other words, it is desirable that the encoding parameters are input so that a plurality of deteriorated videos of different qualities are generated. For example, if deteriorated videos are prepared only for combinations of encoding parameters (resolution, frame rate, bit rate) that the service provider actually plans to provide (for example, 3840×2160/60 fps @8 Mbps, 1920×1080/30 fps @2 Mbps, 1280×720/30 fps @1 Mbps, 960×540/30 fps @0.5 Mbps, 480×270/30 fps @0.2 Mbps), overtraining for coefficients of a mathematical model optimized by the deriving unit 13 described later may occur and appropriate quality estimation accuracy may not be guaranteed. In particular, as for the bit rate, using only the bit rates actually used for the service is not sufficient in terms of the number of samples.

Thus, when bit rate is determined for the combinations of resolution and frame rate assumed by the service provider (for example, "3840×2160 pixels, 60 fps", "3840×2160 pixels, 30 fps", "1920×1080 pixels, 30 fps", "1280×720 pixels, 30 fps", "960×540 pixels, 30 fps", "480×270 pixels, 15 fps"), it is desirable that at least three levels of bit rates, such as bit rates with a high quality, bit rates with medium-level quality, and bit rates with low quality, are set for each combination of resolution and frame rate, by using a quality estimation technique or the like. For example, if four levels of bit rates are set for each of the above six pairs of resolution and frame rate for a certain codec setting, the number of sets of encoding parameters will become 6×4=24 sets. In this case, 24 deteriorated videos are generated for the codec setting.

As a result, an improvement in the accuracy of optimization for the coefficients of the mathematical model by the deriving unit 13 described later can be expected. That is, if the range of variation in quality of the prepared deteriorated video is not sufficiently wide, estimation accuracy for quality calculated from the mathematical model will become low. To avoid such an issue, as described above, it is necessary to prepare deteriorated videos with uneven quality in an appropriate range. Further, although the bit rate has been described as an example in the above, the quality also changes depending on the change in the resolution and the frame rate, and thus, it is desirable to set at least three levels of resolution to take into account quality change depending on resolution and similarly, at least three levels of frame rate so as to provide different qualities.

Subsequently, the quality estimation unit 12 receives as inputs the original video and a plurality of deteriorated videos and calculates an estimated value of the video quality of each deteriorated video (hereinafter, simply referred to as "quality estimation value") (S102). As for the quality estimation techniques, for example, Video Multi-method Assessment Fusion (VMAF) (https://github.com/Netflix/vmaf), Peak Signal-to-Noise Ratio (PSNR), and the like can be used. In the present embodiment, an example using the full-reference model is described, but it is also possible to derive a quality estimation value using a reduced-reference model or a no-reference model. If the no-reference model is used, the original video need not necessarily be input to the quality estimation unit 12. This is because the original video is not required in this case.

The quality estimation unit 12 calculates, for example, an average value of the quality estimation values of all video frames of the deteriorated video, as the quality estimation value of the deteriorated video. In other words, one quality estimation value is calculated for one deteriorated video.

However, when the average value of the quality estimation values for video frames is used as the quality estimation value of the deteriorated video, it is not possible to capture the decline in the perceived quality (subjective quality) due to the decrease in the frame rate. This point is also clear from FIG. 4. That is, although, from FIG. 4, it is possible to understand the tendency of mean opinion score (MOS) to decrease when the VMAF declines, in FIG. 4, the relationship between the VMAF and the MOS is not represented by one line. Thus, it can be seen that the influence of the frame rate on the video quality cannot be grasped. Thus, a mapping function representing a relationship between the subjective quality experienced by the viewer and the decline in the frame rate (in consideration of the influence of frame rate on subjective quality) may be created in advance for each frame rate. When the PSNR being a full-reference model is used, it is known that it is difficult to directly estimate the subjective quality from the PSNR because the characteristics of the original video cannot be captured. A plurality of original videos may be fixedly used for creating deteriorated videos and a mapping function may be created for each of the original videos. For example, a mapping function 1 (for example, FIG. 5) representing the relationship of the subjective quality with the original video 1 (the relationship in consideration of the influence of the original video on the subjective quality), and a mapping function 2 representing the relationship of the subjective quality with the original video 2 (the relationship in consideration of the influence of the original video on the subjective quality) may be created. Such a mapping function is a mapping function that receives the average value calculated by the method described above as input, and converts the average value to a quality estimation value indicating the subjective quality. The quality estimation unit 12 may input, for each deteriorated video, an average value of the quality estimation values calculated for frames of the deteriorated video to a mapping function corresponding to the frame rate and the original video of the deteriorated video, and calculate a quality estimation value in consideration of the influence of decline in the frame rate on perceived quality (decline in perceived quality) and the influence of the original video on the subjective quality.

For example, frame rates such as 60 fps, 50 fps, 30 fps, 25 fps, 24 fps, 15 fps, and the like are often used. Thus, for each of the frame rates, a correspondence relationship between the subjective quality of each video associated with the frame rate and the average value of the quality estimation values for all frames of each video associated with the frame rate is mapped with a quadratic function, a cubic function, a logarithmic function, an exponential function, a logistic function, or the like (for example, mapping functions 1 to 4 below), using the relationship illustrated in FIG. 4, and coefficients of the mapping function are retained for each of the frame rates. Further, a mapping function may be created for each original video. For example, a mapping function 1 indicating the relationship of the subjective quality with the original video 1 (that is, the relationship illustrated in FIG. 5) (a mapping function in consideration of the influence of the original video on the subjective quality), and a mapping function 2 indicating the relationship of the subjective quality with the original video 2 may be created. The quality estimation unit 12 inputs, for each deteriorated video, an average value of the quality estimation values for frames of the deteriorated video to a mapping function corresponding to the frame rate and the original video of the deteriorated video, and is thus able to derive a quality estimation value for the frame rate. In this case, the quality estimation unit 12 outputs the quality estimation value obtained by the mapping function to the deriving unit 13. The mapping function may be created for each frame rate, for each original video, or for each set of the frame rate and the original video, and any form may be adopted.

Further, in general, the quality estimation value is derived as a value from 1 to 5, or from 0 to 100. Here, if the quality estimation value derived by the quality estimation unit 12 is 0 to 100, while the quality measurement value that can be accepted by the deriving unit 13 is 1 to 5, the above-described mapping function is created to output quality estimation values from 1 to 5.

Examples of the mapping function are described below.

MOSfromVMAF=$ai$+$bi$VMAF+$ci$VMAF$^2$    Mapping Function 1

Here, VMAF is the average value of the quality estimation values calculated for frames for the deteriorated video, which are calculated by using VMAF, ai, bi, and ci are coefficients for each frame rate, i is the frame rate, and MOSfromVMAF is a quality estimation value derived by the mapping function.

MOSfromPSNR=$aj$+(1−$aj$)/(1+(PSNR/$bj$)$^{cj}$)    Mapping Function 2

Here, PSNR is the average value of the PSNR calculated for frames for the deteriorated video, aj, bj, and cj are coefficients for each original video, j is an original video number, and MOSfromPSNR is a quality estimation value derived by the mapping function.

MOSfromPSNR=$aij$+(1−$aij$)/(1+(PSNR/$bij$)$^{cij}$)    Mapping Function 3

Here, PSNR is the average value of the PSNR calculated for frames for the deteriorated video, aij, bij, and cij are coefficients for each frame rate and the original video, i is the frame rate, j is the original video number, and MOSfromPSNR is a quality estimation value derived by the mapping function.

Although the calculation of the mapping function 1 (MOSfromVMAF) is represented by a quadratic function, the mapping function 1 may be represented by a logistic function like the mapping function 2 or 3.

Figure 4:
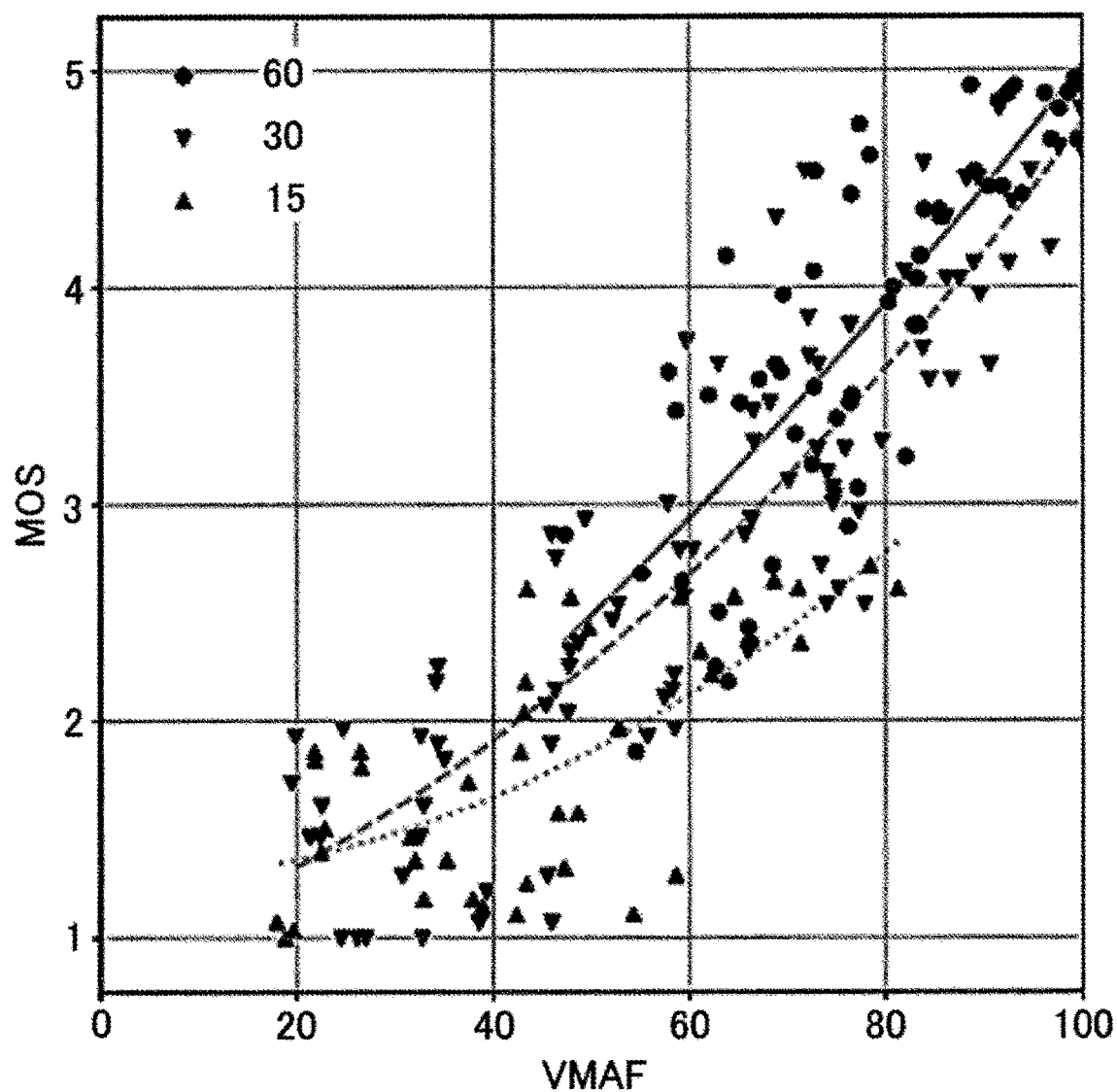
FIG. 4 is a diagram illustrating a relationship between a subjective quality of a video and a VMAF being a full-reference model.
Figure 5:
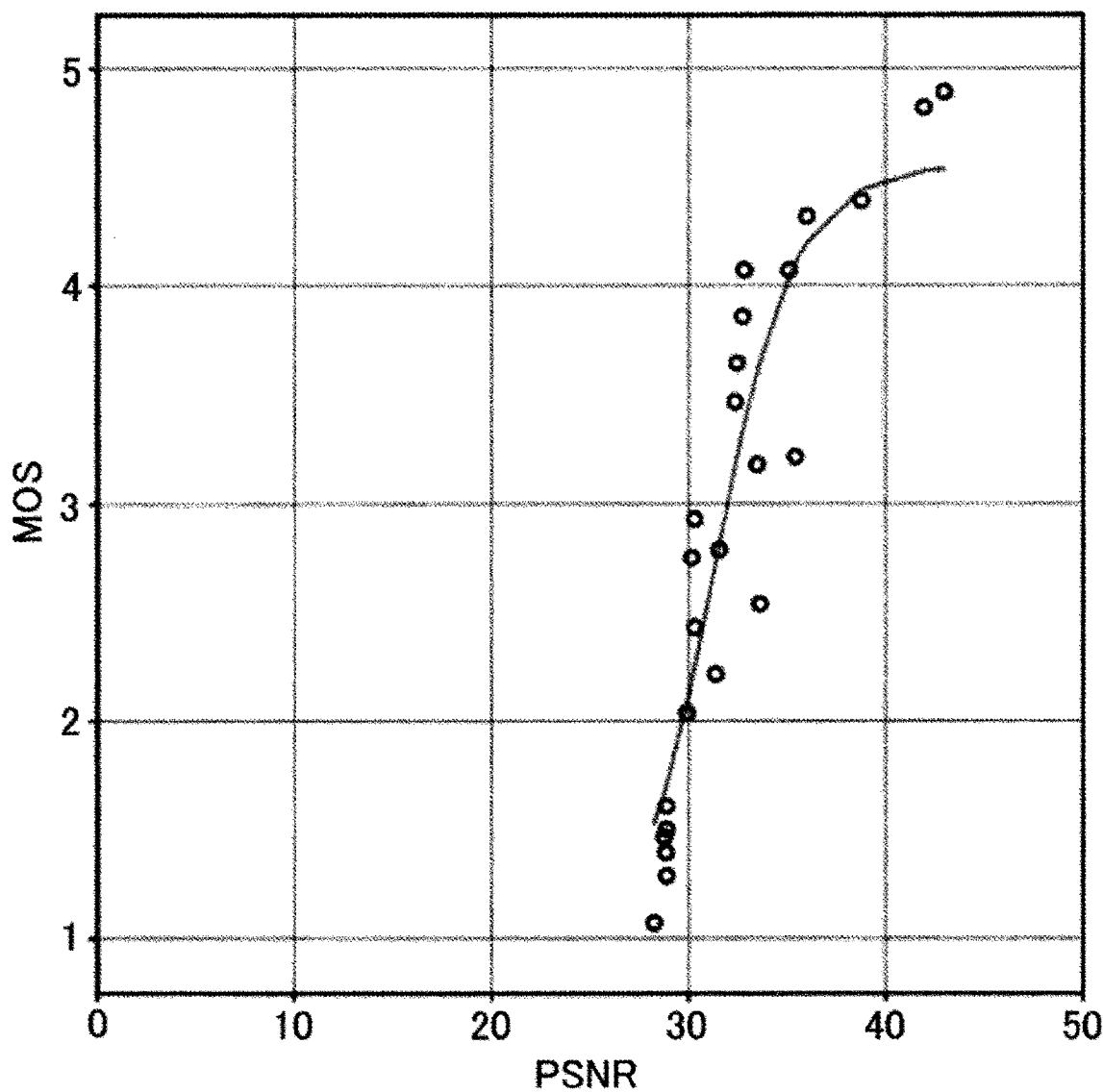
FIG. 5 is a diagram illustrating a relationship between a subjective quality of a video and a PSNR being a full-reference model.

As described above, in a technique such as VMAF by which the influence of the original video on the subjective quality can be grasped, the quality estimation values of 1 to 5 can be estimated by using only the mapping function in which the influence of the frame rate on the subjective quality illustrated in FIG. 4 is taken into account. On the other hand, in a technique such as PSNR by which the influence of the original video on the subjective quality cannot be grasped, the quality estimation values of 1 to 5 can be estimated by using the mapping function in which the influence of the original video on the subjective quality illustrated in FIG. 5 is taken into account. Thus, if the quality estimation value is to be derived using the same original video at all times, the use of PSNR makes it possible to easily derive the quality estimation value. On the other hand, if it is difficult to always use a fixed original video when deriving the quality estimation value, it is desirable to derive the quality estimation value using a technique such as VMAF by which the influence of the original video on the subjective quality can be grasped.

Subsequently, for each codec setting, the deriving unit 13 derives (optimizes) the coefficients of a mathematical model preset as the mathematical model for estimating a video quality VQ, based on the plurality of sets of encoding parameters input for the codec setting, and the quality estimation value calculated for each of the sets of the encoding parameters (S103). That is, the (coefficients of) the mathematical model is derived for each codec setting.

The coefficient optimization method can be derived, based on the least squares method, the Solver of Microsoft (registered trademark) Excel (registered trademark), or an optimization method using Python or R. However, in the present embodiment, a mathematical model for calculating the video quality VQ from the video bit rate br, the resolution rs, and the frame rate fr is used (NPL 4). The mathematical model calculates the video quality VQ using the following mathematical equations in consideration of the theoretical highest/maximum video quality X determined for each set of the resolution and frame rate, the characteristic that the highest/maximum video quality X declines as the resolution rs and frame rate fr decrease, and the characteristic that the video quality VQ declines as the video bit rate br decreases with respect to the highest/maximum video quality X.

$$VQ = X + (1-X)/\left(1+\left(br/Y\right)^{v_1}\right) \quad \text{[Math. 1]}$$

$$X = \frac{4(1-\exp(-v_3 fr))rs}{v_2+rs} + 1$$

$$Y = \frac{v_4 rs + v_6 \log_{10}(v_7 fr + 1)}{11 - e^{-v_5 rs}}$$

rs is a resolution obtained from the number of lines and the number of pixels in the vertical and horizontal directions (for example, the total number of pixels such as 1920× 1080). However, when it is possible to know only the number of lines in the vertical direction or the number of pixels in the horizontal direction, rs is the resolution calculated by a known method from the number of lines or the number of pixels. fr is the frame rate. $v_1, \ldots v_7$ are coefficients being the derivation targets (optimization targets).

Specifically, for each codec setting, the deriving unit 13 associates the plurality of quality estimation values calculated for the codec setting, with the video quality VQ, and associates the plurality of combinations of encoding parameters input to the codec setting, with br, rs, and fr, and thereby derives (optimizes) the coefficients of a mathematical model.

Although only one original video is used in the above described example, a plurality of original videos (for example, eight or more types) may be input to the encoding unit, a deteriorated video after encoding may be generated for a plurality of original videos, based on the same codec setting and the same combinations of encoding parameters, and for a plurality of original videos, a quality estimation value may be calculated for each combination of the encoding parameters. By doing so, the number of samples input to the deriving unit 13 can be increased, and the optimization of the coefficient can be stabilized. In this optimization procedure, the coefficients are derived before the quality estimation is actually performed, and thus there is enough time to perform the calculation.

As described above, according to the present embodiment, it is possible to derive a mathematical model capable of evaluating the quality according to the codec setting. For example, when the quality that changes for each codec setting is estimated, it is possible to perform comparative evaluation for the quality even if the encoding parameters are the same.

There are existing issues in estimating video quality for different codec settings, such as an issue that the existing technique (parametric model) receives only the encoding parameters as input and thus does not allow comparative evaluation of video qualities (Issue 1), an issue that the existing technique (parametric model) does not describe any guidance or handling method for comparative evaluation of quality values estimated based on a plurality of codec settings, and thus a user of the parametric model cannot optimize the parametric model to each codec setting and use the parametric model (Issue 2), and the issue that subjective quality values cannot be prepared mechanically when subjective quality evaluation is conducted to obtain subjective quality values for each setting parameter (Issue 3).

In contrast, in the present embodiment, by optimizing, in advance, the coefficients of the mathematical model of the parametric model for the codec setting for which the video quality is to be estimated, the video quality for each codec setting can be derived, and comparative evaluation of quality can be performed. In addition, the present embodiment, by describing a specific optimization procedure, it is possible to provide an optimization technique to a user. It is also possible to prepare the quality estimation values mechanically without conducting subjective evaluation and apply the quality estimation values to optimization.

Thus, the present embodiment makes it possible to easily determine whether quality of a service being provided is maintained at a certain level or greater for the viewer by monitoring the quality values of the video communication service actually viewed by the user using coefficients optimized for each codec setting. As a result, it is possible to know and manage the actual condition of quality of the service being provided in real time.

Thus, it is possible to improve the points concerning the grasping and management of the actual condition of quality of the service being provided, which could not be handled by the related art.

Although the embodiments of the present disclosure have been described in detail above, the present disclosure is not limited to such specific embodiments, and various modifications and change can be made within the scope of the gist of the present disclosure described in the claims.

This application claims priority based on the International Patent Application No. PCT/JP2020/011195, filed on Mar. 13, 2020, and the entire contents of the international patent application are incorporated herein by reference.

REFERENCE SIGNS LIST

10 Mathematical model deriving apparatus
11 Encoding unit
12 Quality estimation unit
13 Deriving unit
100 Drive device
101 Recording medium
102 Auxiliary storage device
103 Memory device
104 CPU
105 Interface device
B Bus

The invention claimed is:

1. A mathematical model deriving apparatus, comprising:
a processor; and
a memory storing program instructions that cause the processor to:
generate a plurality of deteriorated videos in accordance with a plurality of combinations of a plurality of encoding parameters, including a resolution, a frame rate and a bit rate, for a codec setting, the plurality of deteriorated videos being deteriorated due to encoding of an original video;
calculate a quality estimation value of each of the plurality of deteriorated videos; and
derive a coefficient of a mathematical model in accordance with the quality estimation value and the plurality of combinations of the plurality of encoding parameters, the mathematical model outputting video quality in response to the plurality of encoding parameters as input, wherein
the processor calculates, for each of the plurality of deteriorated videos, an average value of quality estimation values of the plurality of deteriorated videos per video frame and calculates the quality estimation value by inputting the average value to a function converting the average value into a quality estimation value in which influence of subjective quality on each of frame rates is considered, the function being created in advance for the frame rates.

2. The mathematical model deriving apparatus according to claim 1, wherein
the processor further calculates, in accordance with the original video, the quality estimation value of each of the plurality of deteriorated videos.

3. The mathematical model deriving apparatus according to claim 1, wherein
the processor generates the plurality of deteriorated videos by setting a plurality of levels of bit rates for each combination of resolutions and the frame rates.

4. A mathematical model deriving apparatus, comprising:
a processor; and
a memory storing program instructions that cause the processor to:
generate a plurality of deteriorated videos in accordance with a plurality of combinations of a plurality of encoding parameters, including a resolution, a frame rate and a bit rate, for a codec setting, the plurality of deteriorated videos being deteriorated due to encoding of original videos;
calculate a quality estimation value of each of the plurality of deteriorated videos; and
derive a coefficient of a mathematical model in accordance with the quality estimation value and the plurality of combinations of the plurality of encoding parameters, the mathematical model outputting video quality in response to the plurality of encoding parameters as input, wherein
the processor calculates, for each of the plurality of deteriorated videos, an average value of quality estimation values of the plurality of deteriorated videos for each of the original videos and calculates the quality estimation value by inputting the average value to a function converting the average value into a quality estimation value in which influence of subjective quality on each of the original videos is considered, the function being created in advance for the original videos.

5. A method for deriving a mathematical model executed by a computer, the method comprising:
generating a plurality of deteriorated videos in accordance with a plurality of combinations of a plurality of encoding parameters, including a resolution, a frame rate and a bit rate, for a codec setting, the plurality of deteriorated videos being deteriorated due to encoding of an original video;

calculating a quality estimation value of each of the plurality of deteriorated videos; and deriving a coefficient of a mathematical model in accordance with the quality estimation value and the plurality of combinations of the plurality of encoding parameters, the mathematical model outputting video quality in response to the plurality of encoding parameters as input, wherein the calculating calculates, for each of the plurality of deteriorated videos, an average value of quality estimation values of the plurality of deteriorated videos per video frame, and calculating the quality estimation value by inputting the average value to a function converting the average value into a quality estimation value in which influence of subjective quality on each of frame rates is considered, the function being created in advance for the frame rates.

6. The method for deriving a mathematical model according to claim 5, wherein the calculating further calculates, in accordance with the original video, the quality estimation value of each of the plurality of deteriorated videos.

7. A non-transitory computer-readable recording medium having stored therein a program causing the computer to perform the method according to claim 5.

8. The method for deriving a mathematical model according to claim 5, wherein the generating generates the plurality of deteriorated videos by setting a plurality of levels of bit rates for each combination of resolutions and the frame rates.

* * * * *